United States Patent
Haraden et al.

(10) Patent No.: US 8,140,922 B2
(45) Date of Patent: Mar. 20, 2012

(54) METHOD FOR CORRELATING AN ERROR MESSAGE FROM A PCI EXPRESS ENDPOINT

(75) Inventors: Ryan S. Haraden, Rochester, MN (US); Gregory M. Nordstrom, Pine Island, MN (US); Vikramjit Sethi, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 514 days.

(21) Appl. No.: 12/123,780

(22) Filed: May 20, 2008

(65) Prior Publication Data
US 2009/0292960 A1    Nov. 26, 2009

(51) Int. Cl.
*G01R 31/3181* (2006.01)
*G01R 31/40* (2006.01)

(52) U.S. Cl. .................... 714/724; 714/712
(58) Field of Classification Search .......... None
See application file for complete search history.

(56) References Cited

U.S. PATENT DOCUMENTS

| | | | |
|---|---|---|---|
| 5,600,584 A * | 2/1997 | Schlafly | 708/551 |
| 5,687,316 A * | 11/1997 | Graziano et al. | 709/250 |
| 7,346,812 B1 * | 3/2008 | Wickeraad | 714/48 |
| 7,610,431 B1 * | 10/2009 | Watkins et al. | 710/312 |
| 7,774,638 B1 * | 8/2010 | Cavanagh et al. | 714/4.2 |
| 2007/0088873 A1 * | 4/2007 | Oshikiri et al. | 710/58 |
| 2007/0130407 A1 * | 6/2007 | Olson et al. | 710/305 |
| 2008/0016405 A1 * | 1/2008 | Kitahara | 714/43 |
| 2009/0254692 A1 * | 10/2009 | Feehrer | 710/315 |

* cited by examiner

*Primary Examiner* — Cynthia Britt
*Assistant Examiner* — Dipakkumar Gandhi
(74) *Attorney, Agent, or Firm* — Bockhop & Associates LLC

(57) ABSTRACT

In a method of handling errors in a digital system that includes a root complex in data communication with at least one endpoint, the endpoint including at least one advanced error reporting register, an error is detected by the endpoint. Error data indicative of the error is stored in an advanced error reporting register. An indication of which transaction caused the error is stored in a secondary location. An error message packet that includes the error data and the indication of which transaction caused the error is generated. The error message packet is transmitted to the root complex. The root complex is caused to take a preselected action in response to the error message packet.

19 Claims, 3 Drawing Sheets

METHOD FOR CORRELATING AN ERROR MESSAGE FROM A PCI EXPRESS ENDPOINT

BACKGROUND OF THE INVENTION

1. Field of the Invention

The present invention relates to digital communication systems and, more specifically, to a system that communicates error information between an endpoint and a root complex.

2. Description of the Prior Art

Digital systems employ several different standard bus types to facilitate communication between different entities. One type of digital system includes a central root complex that is in communication with one or more endpoints via a bus system. One such bus system, PCI express, is an industry standard input/output (IO) bus used to connect IO devices to a processor complex via a root complex bridge.

Many communication systems employ a periodic cyclic redundancy check (CRC) to detect alteration of data being communicated. CRCs are popular because they are simple to implement in binary hardware, are easy to analyze mathematically, and are particularly good at detecting common errors caused by noise in transmission channels.

IO transactions from a root complex to an IO adapter may have CRC errors, may be malformed, poisoned, timed out, aborted, unexpected or even unsupported. When a PCI express endpoint detects an error, it logs the PCI transaction details in one or more PCI standard advanced error reporting (AER) registers, but it only sends a generic error message to the root complex.

This error message only specifies the severity of the error—whether it is fatal or non fatal—but it does not correlate the error message to the specific transaction that had an error. It is possible that a fatal error would require platform firmware to reset the root complex. It is also possible that a PCI-Express link would go down and not retrain, in which case there would be no way for root complex hardware or host software to access the AER registers in the adapter attached on the PCI express link and, therefore, it would be impossible to determine which transaction had an uncorrectable error and what the error was. This is a serious limitation that reduces system availability and increases warranty costs for the host and adapter vendors to isolate the source of these errors. The current error reporting mechanism from the adapter also prevents any possible auto retry of several uncorrectable errors by the root complex without any software intervention. This is also a limitation that reduces availability and increases warranty expense.

Therefore, there is a need for a system that transmits error information from an endpoint to a root complex that identifies an error and the transaction that is executing when the error occurs.

SUMMARY OF THE INVENTION

The disadvantages of the prior art are overcome by the present invention which, in one aspect, is a method of handling errors in a digital system that includes a root complex in data communication with at least one endpoint, the endpoint including at least one advanced error reporting register. An error is detected by the endpoint. Error data indicative of the error is stored in an advanced error reporting register. An indication of which transaction caused the error is stored in a secondary location. An error message packet that includes the error data and the indication of which transaction caused the error is generated. The error message packet is transmitted to the root complex. The root complex is caused to take a preselected action in response to the error message packet.

In another aspect, the invention is a method of handling errors in a digital interconnect architecture that includes a root complex in data communication with at least one endpoint, the endpoint including at least one advanced error reporting register. When an error occurs when a transaction layer packet is being transmitted, error data indicative of the error is stored in an advanced error reporting register. The error data include a type indicator that indicates a classification of the error, an operation counter that indicates which operation in a queue of operations was executing when the error was sensed and a source indicator that indicates that a source of the error was the endpoint when the transaction layer packet is being transmitted from the endpoint. The error data indicate that the source of the error was the root complex when the transaction layer packet is being transmitted to the endpoint from the root complex. A data packet that includes the error data is generated. The data packet is transmitted to the root complex. The root complex is caused to take a preselected action in response to the data packet.

In yet another aspect, the invention is a digital system that includes a root complex and at least one endpoint in data communication with the root complex. The endpoint includes at least one advanced error reporting register. The endpoint is configured to populate the advanced error reporting register with error data upon occurrence of an error detected by the endpoint. The endpoint is also configured to transmit an error message to the root complex upon occurrence of the error so that the error message includes the error data.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

DETAILED DESCRIPTION OF THE INVENTION

Figure 1:
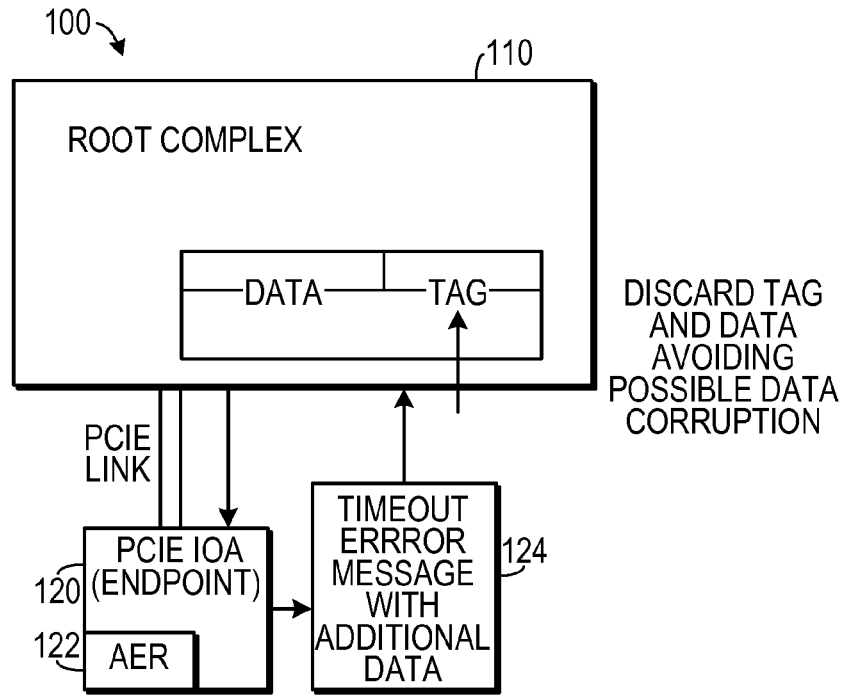
FIG. 1 is a schematic diagram of a root complex and an endpoint.

A preferred embodiment of the invention is now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on."

In one embodiment, when an error when an error occurs, such as when a transaction layer packet is being transmitted, and when the error is detected by an endpoint, the endpoint stores in its advanced error reporting (AER) registers information about the error such as an error pointer and an identification of the source of the error.

Generally, the error data will include such information a type indicator that indicates a classification of the error, an operation counter that indicates which operation in a queue of operations was executing when the error was sensed and a source indicator that indicates that a source of the error was the endpoint when the transaction layer packet is being transmitted from the endpoint and that indicates that the source of the error was the root complex when the transaction layer packet is being transmitted to the endpoint from the root complex. The source indicator could also include an identification of the bus on which data were being received when the error occurred, an identification of the request that was issued immediately before the error occurred and an identification of the function that was executing when the error occurred. This information is then transmitted from the endpoint to the root complex and the root complex may take a corrective action based on the value of this information.

As shown in FIG. 1, one embodiment is a system for handling errors in a digital interconnect architecture 100 (e.g., PCI Express) that includes a root complex 110 in data communication with at least one endpoint 120. The endpoint 120 includes at least one advanced error reporting register 122 in which is stored information about an error detected by the endpoint 120. The advanced error reporting (AER) registers 122 could include, for example, registers such as: an uncorrectable error status register, an uncorrectable error mask register, an uncorrectable error severity register, a correctable error status register, a correctable error mask register, an advanced error capabilities and control register.

The error data could include such information as: a type indicator that indicates a classification of the error; an error pointer employed in a specification of an interconnect architecture; an operation counter that indicates which operation in a queue of operations was executing when the error was sensed; and a source indicator that indicates a source of the error. If the error occurs when a transaction layer packet is being transmitted from the endpoint 120, then the source indicator includes an identification of the endpoint 120 as the source of the error. On the other hand, if the error occurs when a transaction layer packet (TLP) is being transmitted to the endpoint 120 from the root complex 110, then the source indicator includes an identification of the root complex 110 as the source of the error.

An indication of which transaction caused the error is stored in a secondary location 124. An error message packet that includes the error data and the indication of which transaction caused the error is assembled and is transmitted to the root complex 110. Based on the data in the error message packet, the root complex 110 will take a preselected action, such as sending a vendor-defined message from the root complex 110 to the endpoint 120. In response, the endpoint 120 could be configured to take such actions as resetting an error information, re-executing a previous operation, or causing a fatal error.

The system includes a methodology that informs the root complex as to which transaction was bad, correlates the error message to a specific transaction sent from the root complex, and enables the root complex to attempt auto retries for otherwise uncorrectable fatal/non-fatal error messages without software intervention.

Figure 2:
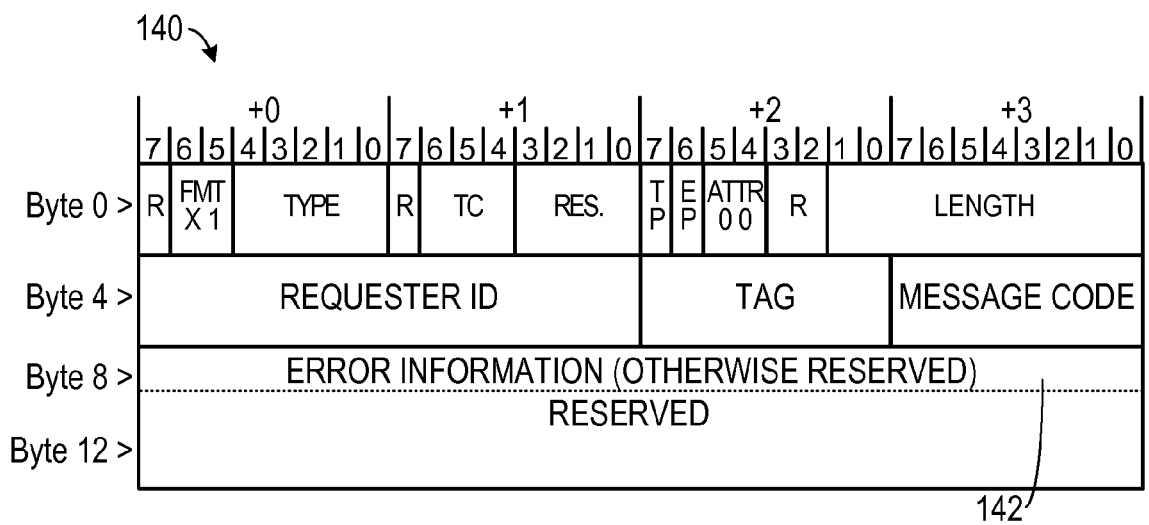
FIG. 2 is a schematic diagram of a data packet format for transmitting data between the root complex and the endpoint.

As shown in FIG. 2, in a PCI Express (PCIE) embodiment, the system uses available undefined space in the PCI Express (PCIE) error message format 140, in which a PCIE endpoint (the hardware entity connected to a PCIE root complex, or host bridge, by a PCIE link) can place additional transaction information 142 that uniquely identifies a PCI transaction in error, and what caused the error. In one representative embodiment, this information is placed in bytes 8-11 of the error message format 140. This additional information requires no additional system resources or bandwidth as it us unused reserved bytes of the PCIE standard error message format 140.

Figure 3:
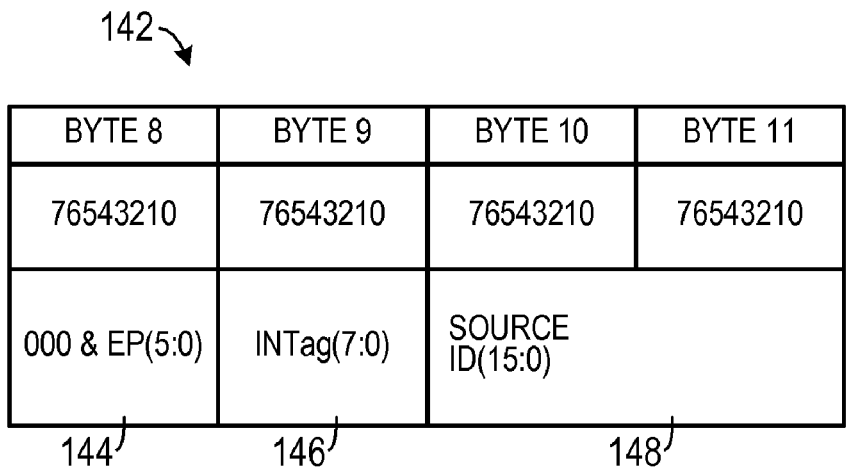
FIG. 3 is a schematic diagram of a portion of an error message packet.

As shown in FIG. 3, in one embodiment, the additional transaction information 142 in the error message includes an error pointer 144 that indicates which type of error occurred, an instruction tag 146 that indicates which instruction was pending when the error occurred, and a source identifier 148 that indicates the likely source of the error.

The system improves both error isolation and system availability, as it allows the root complex to correlate the error messages with a transaction involved or causing the error. The system allows the root complex to associate an error message with a failed packet, which improves problem isolation by allowing error logging to correlate an error to the transaction involved specifically. In both lab testing and field service, isolation of hardware related errors is very complex and lengthy—sometimes impossible in customer installations if the customer or environment does not allow hardware instrumentation. The system also enables the root complex to retry some transaction types by making the error cause and affected transaction known to the root complex. This increases system availability and reduces firmware or software recovery development expense by enabling automatic hardware retry recovery, thereby avoiding adapter resets and recovery for errors that would otherwise be uncorrectable without host software intervention.

Using the system, it is possible to have hardware automatically recover from errors that previously would have been fatal potentially either causing a loss of the device or a new initialization of the link. Detailed examples of such recovery are described for two common cases: (1) completion timeout and (2) memory mapped input/output (MMIO) store error. Other cases are apparent that can utilize this invention, but these may be more common and difficult to isolate.

With this system, the root complex and host or device driver firmware need not perform additional transactions to the endpoint to collect the PCIE standard AER registers from the endpoint hardware. System software can read the error cause directly from the root complex register space. This is a significant advantage to reducing field warranty costs, especially if the error or its recovery has caused loss of link train or has caused the link to be no longer reliable. Unreliable or loss of link train makes it difficult for system software to reliably collect AER registers over the link and determine or log error cause. The disclosed system also prevents possible secondary errors by trying to collect error registers from a device that may be in a bad or unpredictable state.

If the root and endpoint both support the system disclosed herein, then the chipset can realize some additional benefits. The examples below show how a normally fatal error message can be converted into a hardware recoverable error without software intervention.

MMIO writes can recover from both end-to-end cyclic redundancy check (ECRC) errors and poisoned errors using the new error information as follows: The MMIO write is sent to the input/output adapter (IOA). In existing systems, this transaction would be considered done. However, the present system saves the information. The system invalidates this information if a new MMIO write, MMIO read, or direct memory access (DMA) read has been executed. Completion occurs since the system can no longer retransmit the packet due to ordering rules. The endpoint detects an ECRC error and transmits an Error message. The root port can attempt to match the tag in the error message with the saved MMIO and see if is still valid. If so, the system will not report the error and will resend the MMIO store. If the saved MMIO is not valid, then the system will report error as normal.

Figure 4:
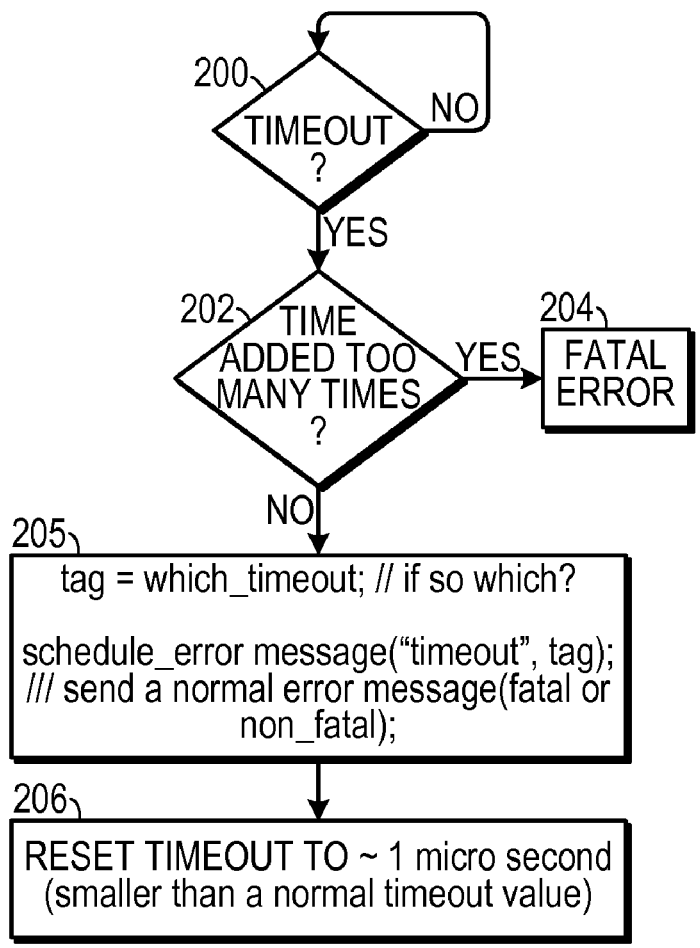
FIG. 4 is a flow chart showing a routine that is executed by an endpoint for responding to a timeout.
Figure 5:
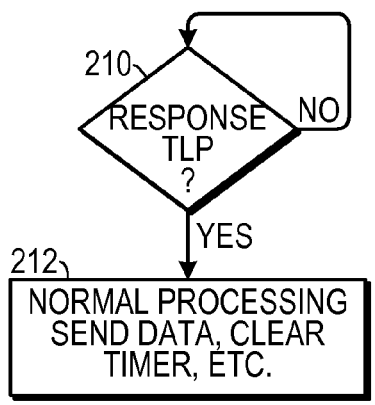
FIG. 5 is a flow chart showing a routine that is executed by an endpoint when a translation layer packet is received.

As shown in FIG. 4, the following demonstrates how the system handles a completion timeout error (such as when a DMA read that fails to get any response data). In a first representative solution, the endpoint detects a timeout 200. If the endpoint has failed more than a predetermined number of attempts 202 (due to the root complex not responding) the system recognizes that a fatal error has occurred 204. Otherwise, the timeout counter will be reset to a predetermined value and the system bypasses the normal error recovery for this error. In doing so, the system sends 205 a modified fatal/non-fatal error message indicating that a timeout has occurred and providing tag information to the root complex. The endpoint then resets its timeout counter 206 to a predetermined value. As shown in FIG. 5, the endpoint will wait for a response translation layer packet (TLP) 210 and will continue normal processing 212 once it is received.

Figure 6:
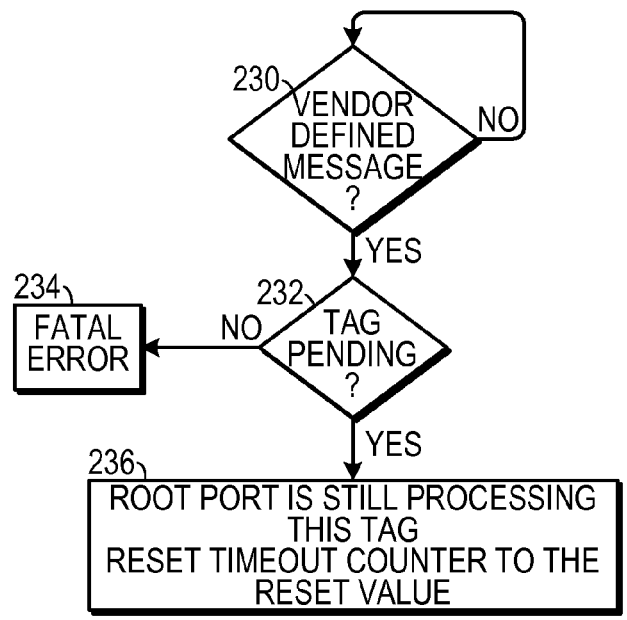
FIG. 6 is a flow chart showing a routine that is executed by an endpoint when a vendor-defined message is received.

As shown in FIG. 6, in another approach, a vendor-defined message is added to allow the root to send additional information to the endpoint. When a vendor-defined message is received 230, the endpoint determines 232 if the root port still has the read tag outstanding for a timeout it detected and reported to the root complex via the method in shown FIG. 5. If the tag does not match the one that the endpoint sent, the system will generate a fatal error 234. Otherwise, the endpoint will assume that the root complex is processing the tag and the endpoint will reset the timeout counter to a predetermined reset value 236. The root complex will then used the error message to get the tag from the request that is still outstanding. If the root complex is still processing this request, it can respond to the endpoint using a vendor-defined message. The endpoint can then wait for this message and if it gets the new message it can reset the timer confident that the request has not been lost. If a message has not been returned quickly enough or if the endpoint gets back a invalid/reserved tag, then the endpoint will continue its normal error processing on the timeout.

Figure 7:
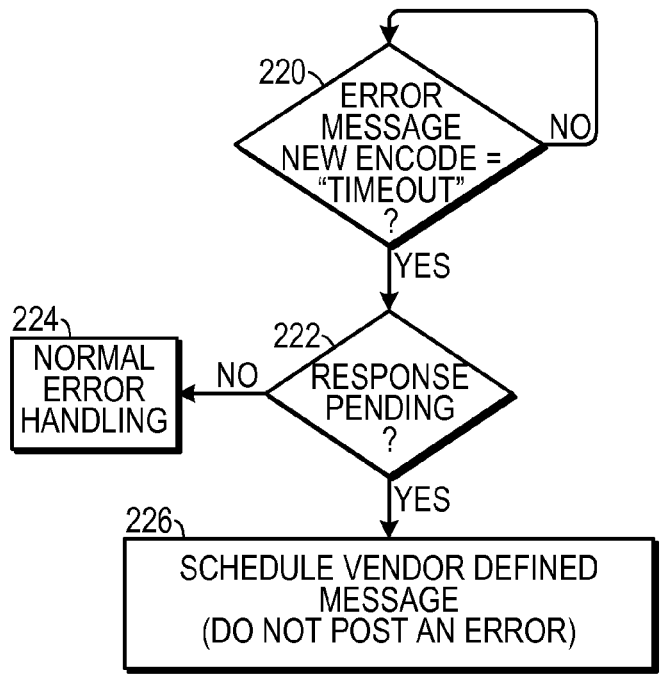
FIG. 7 is a flow chart a routine that is executed by a root complex in response to an error.

The actions taken by the root complex are shown in FIG. 7, in which the root complex waits for a new error message timeout 220. If no response is pending 222 then normal error handling occurs 224. Otherwise, the root complex will schedule transmission of a vendor-defined message and will not post an error 226.

The following is one example of an implementation of this system, shown in a pseudocode format:

```
ENDPOINT:
    if ( check_for_timeout( ) ) then      // Did the endpoint detect a TIMEOUT on an outstanding completion?
        tag = which_timeout( ); // if so which?
        schedule_error_message("timeout", tag);      /// send a normal error message(fatal or non_fatal);
        if (check_taglog(tag) > deadman) then      /// Have we looped though this before? only allow a few times
            set_AER_bits("timeout");      /// Yep, do normal error handling
            fail(tag);
        else
            add_time(tag, Xus);      /// Lets try again, normally dma read timeout's are very large but this message just needs to get to the root
                            //// if it can't get there in X micro secs and back something it wrong
            add_taglog(tag);      /// add our loop count for the deadman check
        end;
    end;
    if ( tlp_response( ) ) then      /// we got a completion!
        tag = get_response_tag( );      /// Figure out which one and remove it from the completion timeout list, ect
        complete(tag);
    end;
    if (tlp_newmessage( ) then      // Root is still working on a completion
        tag = get_message_tag( );      // figure out which one
        If valid_tag( ) then
            add_time(tag, max);      // reset the completion time to the maximum value ( so in this case it isn't an add)
        else
            post_fatal_error( )
        endl
    end;
ROOT:
    if (tlp_error_timeout ( ) ) then      // we got a completion timeout (need the new info to determine which one)
        tag = get_error_tag;      /// which request?
        if (valid_tag(tag)) then      // Is it in process perhaps waiting on ordering rules etc..
            schedule_new_message(tag);      // Yes? Ok tell the endpoint to add more time
```

```
        else
            error_message_handling( )    // Nope, we ether didn't get the request or
already processed it.... this is a real error
        end
    end
```

The above described embodiments, while including the preferred embodiment and the best mode of the invention known to the inventor at the time of filing, are given as illustrative examples only. It will be readily appreciated that many deviations may be made from the specific embodiments disclosed in this specification without departing from the spirit and scope of the invention. Accordingly, the scope of the invention is to be determined by the claims below rather than being limited to the specifically described embodiments above.

What is claimed is:

1. A method of handling errors in a digital system that includes a root complex in data communication with at least one endpoint, the endpoint including at least one advanced error reporting register, the method comprising:
   a. detecting an error by the endpoint;
   b. storing error data indicative of the error in an advanced error reporting register;
   c. storing an indication of which transaction caused the error in a secondary location;
   d. generating an error message packet that includes the error data and the indication of which transaction caused the error;
   e. transmitting the error message packet to the root complex; and
   f. causing the root complex to take a preselected action in response to the error message packet.

2. The method of claim 1, wherein the error data includes a type indicator that indicates a classification of the error.

3. The method of claim 2, wherein the error data includes an error pointer employed in a specification of an interconnect architecture.

4. The method of claim 3, wherein the interconnect architecture comprises PCI-Express.

5. The method of claim 1, wherein the error data includes an operation counter that indicates which operation in a queue of operations was executing when the error was sensed.

6. The method of claim 1, wherein the error data includes a source indicator that indicates a source of the error.

7. The method of claim 6, wherein if the error occurs when a transaction layer packet is being transmitted from the endpoint, then the source indicator includes an identification of the endpoint as the source of the error.

8. The method of claim 6, wherein if the error occurs when a transaction layer packet is being transmitted to the endpoint from the root complex, then the source indicator includes an identification of the root complex as the source of the error.

9. The method of claim 1, wherein the advanced error reporting register comprises a register selected from a group of registers consisting of: an uncorrectable error status register, an uncorrectable error mask register, an uncorrectable error severity register, a correctable error status register, a correctable error mask register, an advanced error capabilities and control register, and combinations thereof.

10. The method of claim 1, wherein the action of causing the root complex to take a preselected action comprises the action of sending a vendor-defined message from the root complex to the endpoint.

11. The method of claim 10, wherein in response to a vendor-defined message from the root complex, the endpoint executes the action of resetting an error information.

12. The method of claim 10, wherein in response to the vendor-defined message from the root complex, the endpoint executes the action of causing a fatal error.

13. The method of claim 10, wherein in response to the vendor-defined message from the root complex, the endpoint executes the action of re-executing a previous operation.

14. A method of handling errors in a digital interconnect architecture that includes a root complex in data communication with at least one endpoint, the endpoint including at least one advanced error reporting register, the method comprising:
   a. when an error occurs when a transaction layer packet is being transmitted, storing error data indicative of the error in an advanced error reporting register, the error data including a type indicator that indicates a classification of the error, an operation counter that indicates which operation in a queue of operations was executing when the error was sensed and a source indicator that indicates that a source of the error was the endpoint when the transaction layer packet is being transmitted from the endpoint and that indicates that the source of the error was the root complex when the transaction layer packet is being transmitted to the endpoint from the root complex;
   b. generating a data packet that includes the error data;
   c. transmitting the data packet to the root complex; and
   d. causing the root complex to take a preselected action in response to the data packet.

15. The method of claim 14, wherein the interconnect architecture comprises PCI-Express.

16. A digital system, comprising:
   a. a root complex; and
   b. at least one endpoint in data communication with the root complex, the endpoint including at least one advanced error reporting register and configured to populate the advanced error reporting register with error data upon occurrence of an error detected by the endpoint, the endpoint also configured to transmit an error message to the root complex upon occurrence of the error so that the error message includes the error data.

17. The system of claim 16, wherein the advanced error reporting register is a register selected from a group consisting of: an uncorrectable error status register, an uncorrectable error mask register, an uncorrectable error severity register, a correctable error status register, a correctable error mask register, and an advanced error capabilities and control register.

18. The system of claim 16, wherein the root complex and the endpoint are connected in an interconnect architecture.

19. The system of claim 18, wherein the interconnect architecture comprises PCI-Express.

* * * * *